United States Patent
Beck et al.

(10) Patent No.: US 9,471,250 B2
(45) Date of Patent: *Oct. 18, 2016

(54) INTERMITTENT SAMPLING OF STORAGE ACCESS FREQUENCY

(71) Applicant: International Business Machines Corporation, Armonk, NY (US)

(72) Inventors: Kevin L. Beck, Portland, OR (US); Kevin J. Cherkauer, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 14/303,476

(22) Filed: Jun. 12, 2014

(65) Prior Publication Data

US 2015/0067199 A1    Mar. 5, 2015

Related U.S. Application Data

(63) Continuation of application No. 14/018,115, filed on Sep. 4, 2013.

(51) Int. Cl.
  *G06F 12/00*  (2006.01)
  *G06F 3/06*   (2006.01)
  *G06F 17/30*  (2006.01)

(52) U.S. Cl.
  CPC .......... *G06F 3/0653* (2013.01); *G06F 3/0604* (2013.01); *G06F 3/0613* (2013.01); *G06F 3/0671* (2013.01); *G06F 3/0683* (2013.01); *G06F 17/30306* (2013.01)

(58) Field of Classification Search
  CPC .. G06F 3/0653; G06F 3/0613; G06F 3/0683; G06F 17/30306; G06F 11/3433
  See application file for complete search history.

(56) References Cited

U.S. PATENT DOCUMENTS

| | | |
|---|---|---|
| 5,758,338 A | 5/1998 | Faloutsos et al. |
| 5,950,185 A | 9/1999 | Alon et al. |
| 5,954,820 A * | 9/1999 | Hetzler ................ G06F 1/3203 |
| | | 713/323 |
| 7,493,316 B2 | 2/2009 | Chaudhuri et al. |
| 8,126,742 B2 | 2/2012 | Bond, Jr. et al. |
| 8,255,915 B1 | 8/2012 | Blanding et al. |
| 8,380,942 B1 | 2/2013 | Corddry et al. |
| 2001/0013087 A1 | 8/2001 | Ronstrom |
| 2002/0002556 A1 | 1/2002 | Yoshida et al. |
| 2002/0103965 A1 | 8/2002 | Dawkins et al. |

(Continued)

FOREIGN PATENT DOCUMENTS

WO    2012080707    7/2013

*Primary Examiner* — David X Yi
*Assistant Examiner* — Alan Otto
(74) *Attorney, Agent, or Firm* — North Shore Patents, P.C.; Lesley A. Leonessa

(57) ABSTRACT

The intermittent sampling of storage access frequency is performed by determining a duration of a collection window and a duration of an observation window within the collection window. A position of the observation window within the collection window is randomly selected, and frequencies of accesses of one or more storage objects during the observation window are observed. When a new access of a given storage object occurs, a delta time for the given storage object is calculated as the time of the observed access minus the timestamp of the most recent observed prior access of the given storage object. Optionally, the delta time of two sequential accesses of a given storage object in two different observation windows may be calculated as if the two different observation windows are immediately adjacent to each other.

7 Claims, 4 Drawing Sheets

(56) References Cited

U.S. PATENT DOCUMENTS

| | | |
|---|---|---|
| 2003/0041289 A1* | 2/2003 | Ku .................. G06F 11/3466 714/39 |
| 2003/0140207 A1* | 7/2003 | Nagase ................ G06F 3/061 711/167 |
| 2004/0267746 A1 | 12/2004 | Marcjan et al. |
| 2005/0203881 A1 | 9/2005 | Sakamoto et al. |
| 2005/0223028 A1 | 10/2005 | Geiner et al. |
| 2006/0015529 A1 | 1/2006 | Yagawa |
| 2008/0040301 A1 | 2/2008 | Sadagopan et al. |
| 2009/0300283 A1 | 12/2009 | Kudo |
| 2011/0072206 A1 | 3/2011 | Ross et al. |
| 2011/0225115 A1 | 9/2011 | Moitra et al. |
| 2011/0246639 A1 | 10/2011 | Feder et al. |
| 2011/0270968 A1 | 11/2011 | Salsburg et al. |
| 2012/0029873 A1 | 2/2012 | Chuang et al. |
| 2012/0254197 A1 | 10/2012 | Kuzmin |
| 2012/0278569 A1 | 11/2012 | Kawakami et al. |
| 2012/0317249 A1 | 12/2012 | Salsburg et al. |
| 2013/0174176 A1 | 7/2013 | Kopylovitz |
| 2013/0262749 A1* | 10/2013 | Oikawa ................ G06F 11/004 711/103 |

* cited by examiner

INTERMITTENT SAMPLING OF STORAGE ACCESS FREQUENCY

CROSS-REFERENCE TO RELATED APPLICATIONS

The present application is a continuation of co-pending U.S. patent application Ser. No. 14/018,115, Filed on Sep. 4, 2013. The present application relates to co-pending U.S. patent application Ser. No. 14/018,052, filed on Sep. 4, 2013.

BACKGROUND

Different types of data storage incur different costs, with faster storage costing more per gigabyte than slower storage. One approach to managing storage costs is to use hierarchical or "multi-temperature storage," where frequently accessed (aka "hot") data are stored on faster but more expensive storage (e.g. solid-state "disks"), and less frequently accessed data are moved to progressively slower but cheaper storage (e.g. physical hard disks, tape drives, etc.).

Specific database applications or users also exhibit different workload patterns. Some make high-frequency access to data while others may make less frequent data accesses. In another approach, workload management techniques perform a similar task to multi-temperature storage in that they provide a mechanism to give different workloads differential levels of access to resources. For example, giving a high-priority workload a larger share of available CPU time than other workloads is similar qualitatively to giving a given subset of data residence on a faster backing storage device.

However, the above approaches require user intervention to determine which data or workloads should get proportionally more access to the fast and expensive resources, and which should be relegated more to the slower and cheaper resources.

SUMMARY

According to one embodiment of the present invention, a method for intermittent sampling of storage access frequency, implemented by a computing processor, determines a duration of a collection window. A duration of an observation window within the collection window is also determined. A position of the observation window within the collection window is randomly selected. Frequencies of accesses of one or more storage objects during the observation window are observed.

In one aspect of the present invention, when a new access of a given storage object occurs, a delta time for the given storage object is calculated as a current time of the new access minus a timestamp of a most recent observed prior access of the given storage object.

In one aspect of the present invention, the delta time of two sequential accesses of the given storage object in two different observation windows is calculated as if the two different observation windows are immediately adjacent to each other.

System and computer program products corresponding to the above-summarized methods are also described and claimed herein.

DETAILED DESCRIPTION

Figure 1:
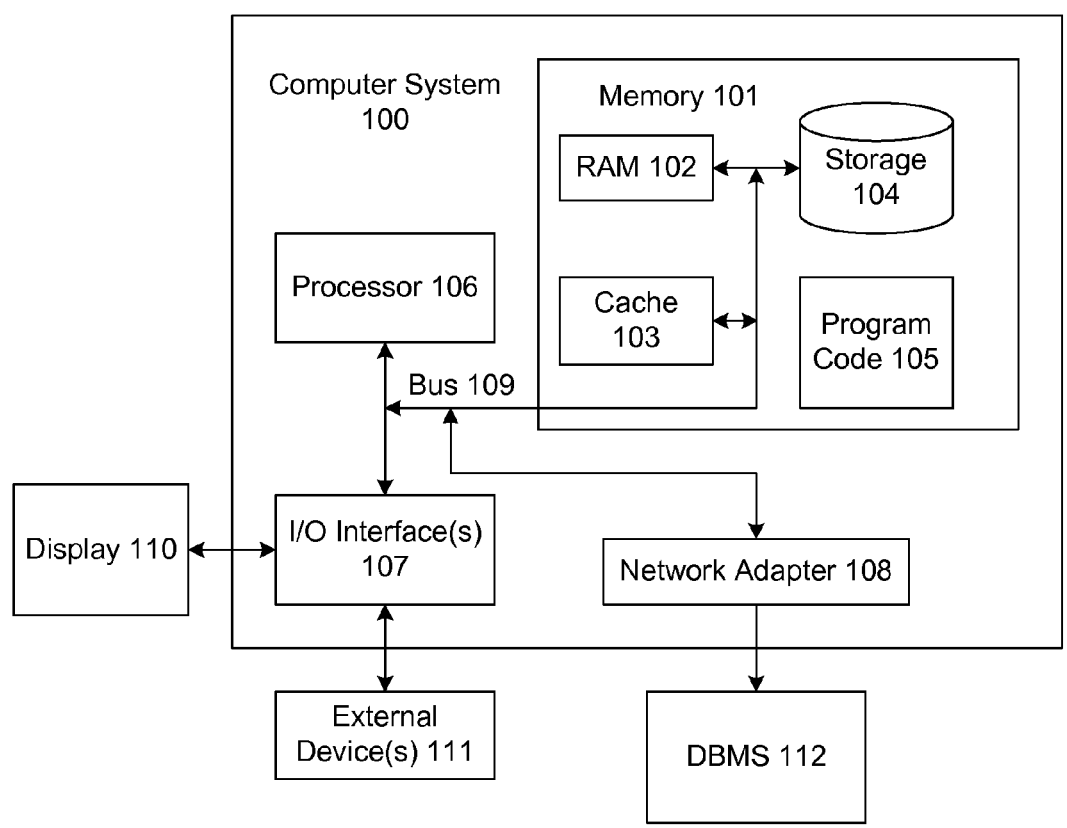
FIG. 1 illustrates an embodiment of a system according to embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Oracle Corporation in the United States, other countries, or both), Smalltalk, C++ or the like and conventional procedural programming languages, such as the "C"

programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an embodiment of a system according to embodiments of the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more database management systems (DBMS) 112 via network adapter 108.

Figure 2:
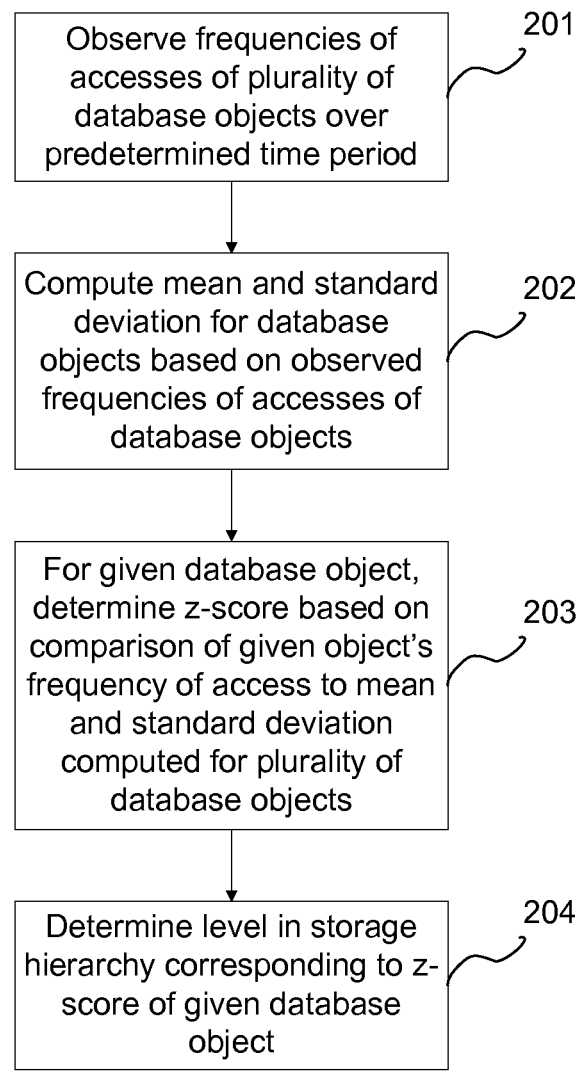
FIG. 2 illustrates a method for defining database objects for storage in a storage hierarchy according to embodiments of the present invention.

FIG. 2 illustrates a method for defining database objects for storage in a storage hierarchy according to embodiments of the present invention. The database objects may include tables, indexes, etc. of a database. The method observes the frequencies of accesses of a plurality of database objects over a predetermined time period (201). The method computes the mean and standard deviation for the plurality of database objects based on the observed frequencies of accesses of the database objects (202). For a given database object, the method determines the z-score based on a comparison of the given object's frequency of access to the mean and standard deviation computed for the plurality of database objects (203). In this embodiment, the z-score indicates the difference, in units of the standard deviation, between the frequency of access of the given database object and the mean and standard deviation for all database objects being observed. The method then determines the level in the storage hierarchy corresponding to the z-score of the given database object (204). The database objects may then be stored or moved to a level of the storage hierarchy corresponding to their z-scores. In this embodiment, when a new database object access is detected, the method calculates the delta time ($\Delta T$) as the current time minus the timestamp of the most recent access of the database object. The $\Delta T$ is then used to update cumulative statistics for the database object, which includes: a count of observations for the database object; the sum of $\Delta T$'s ($\Sigma \Delta T$) for the database object; and the sum of the squares of $\Delta T$'s ($\Sigma (\Delta T)^2$) for the database object. These three cumulative statistics enable the computing of the mean and the standard deviation for the database object, without having to save the timestamp of every access.

In one embodiment, the activities of the database are monitored continuously. In some situations, this continuous monitoring negatively impacts performance and temporary storage for saving captured information. To address the impact on performance and temporary storage, another embodiment according to the present invention monitors the activities of the database intermittently. However, with intermittent monitoring, missing periodic activity entirely may be possible due to harmonic aliasing. For example, if monitoring is enabled for the first minute of every hour, and a job was scheduled to run for ten minutes every four hours on the half hour, the monitor would never capture the information about accesses made by this job. In this embodiment, the method avoids missing accesses due to harmonic aliasing by randomizing the distribution of an observation window within larger collection windows, as described further below.

Figure 3:
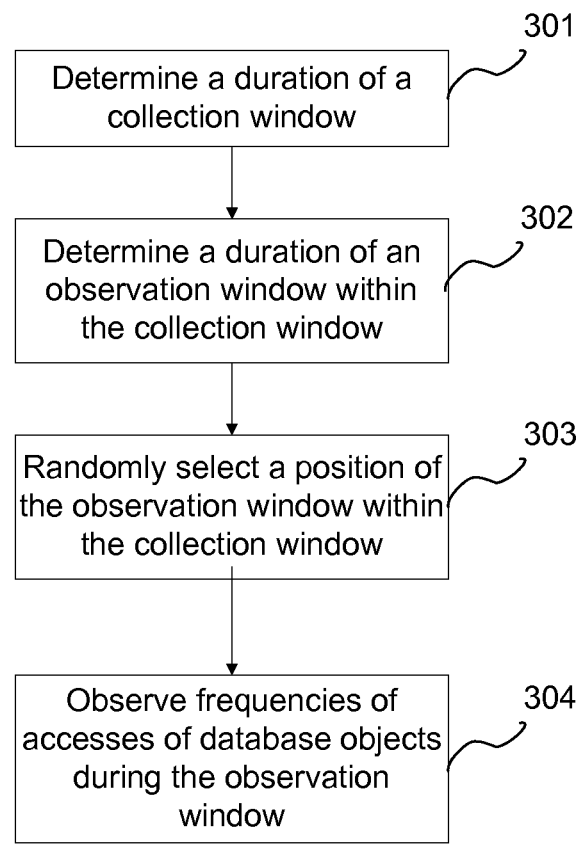
FIG. 3 illustrates a method for intermittent sampling of storage access frequency according to embodiments of the present invention.

FIG. 3 illustrates a method for intermittent sampling of storage access frequency according to embodiments of the present invention. First, the method determines a duration or size of a collection window (301). The method also determines a duration or size of an observation window within the collection window (302). A position of the observation window within the collection window is randomly selected (303). The method then observes the frequencies of accesses of database objects during the observation window (304). In this embodiment, a user is allowed to choose a percentage of time to enable the observation of storage accesses. For example, assume that the duration of the collection window is 100 minutes, i.e., every 100 minutes, an existing collection window ends and a new collection window begins. Assume also that the user chooses to observe 1% of the time. The observation window is thus determined to be one minute long (1% of 100 minutes). The method randomly selects a position of the one minute observation window within the 100 minutes of the collection window, during which database events are observed. In the rest of the collection window, observation is disabled. For any database object accesses that occur during this one minute observation window, $\Delta T$ is calculated for the database object as the current time minus the timestamp of the most recent access of the database object within the observation window, as set forth above. In this manner, database object accesses by regularly scheduled jobs may be observed at least once. When observed over an extended period of time, the observed frequency of accesses of the database object will closely approximate the true frequency as if each access is observed.

Figure 4A:
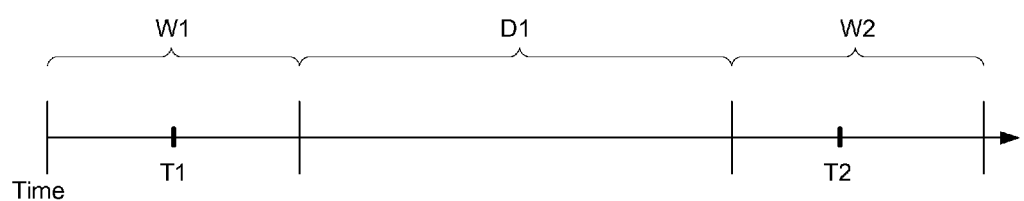
FIGS. 4A and 4B illustrate examples of delta time calculation according to embodiments of the present invention.

Typically, the first and last data points of each observation window are discarded. However, when the time between accesses of a database object is large, discarding the first and last data points would prevent $\Delta T$ from being calculated accurately. For example, when a first access of a database object is within one observation window, and the next observation is not until another observation window, $\Delta T$ cannot be computed in the same manner as above. Further, when the frequency of accesses is low, some observation windows may not observe any accesses. One embodiment of the present invention addresses this scenario by subtracting the amount of time observations are disabled between two observation windows containing two sequential access observations for the database object. For example, FIG. 4A illustrates two observation windows W1 and W2. Observations are disabled for time period D1 between W1 and W2. Assume in this example that a first observation of an access to a database object occurs at time T1 in observation window W1. Assume also that the next observed access to the database object occurs at time T2 in observation window W2, with no observations in-between. In this scenario, $\Delta T$ is calculated as equal to T2−T1−(width of D1). Time period D1, in which observation is disabled, is removed from the calculation of $\Delta T$, and $\Delta T$ is calculated as if the two observation windows, W1 and W2, are immediately adjacent to each other.

Figure 4B:
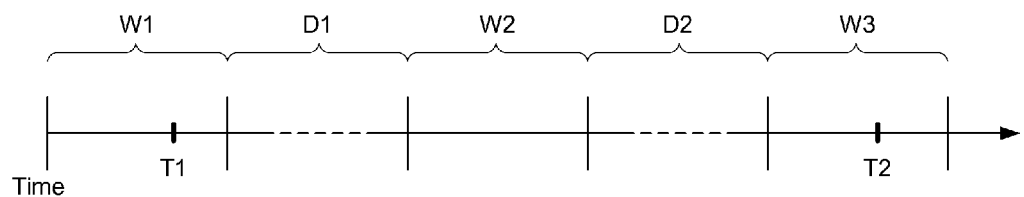

For another example, FIG. 4B illustrates three observation windows W1–W3. Observations are disabled for time periods D1 and D2. Assume in this example that a first observation of an access to a database object occurs at time T1 in observation window W1. Assume also that the next observed access to the database object occurs at time T2 in observation window W3. No accesses to the database object are observed in observation window W2. In this scenario, $\Delta T$ is calculated as equal to T2−T1−(width of D1)−(width of D2). The time periods, D1 and D2, in which observation is disabled, are removed from the calculation of $\Delta T$. Note that the width of the observation window W2 is not subtracted from $\Delta$, even though there were no observed accesses, because W2 represents time during which observation was enabled and thus a lack of accesses for the duration of W2 represents information about the true frequency of accesses to the database object. In this manner, for low frequency accesses, $\Delta T$ can still be calculated.

In some database systems, an event monitor is used to monitor the activities of the database and used to observe accesses to database objects. The event monitor may be implemented with two switches, one state switch that enables and disables the monitor itself, and another switch in the form of a collect clause for a database workload. For performance reasons, activities would not collect monitoring information unless the collect clause is effective on the database workload at the start of the workload, and this information would not go to the event monitor unless the event monitor itself is enabled at the end of the workload. However, when both the state and the collect clause are toggled to indicate the beginning and the end of an observation window, long-running activities that start before the beginning of the observation window and/or end after the end of the observation window may never be observed. To address this scenario, one of the switches may be maintained in the "on" or enabled position at all times. In this manner, whether a given access will be observed depends only on a single check at a single point in time for that access. If that single check falls within the observation window, the access will be observed.

Although embodiments of the present invention are described above in the context of database objects, any storage object may be intermittently sampled in the above manner without departing from the spirit and scope of the present invention. Furthermore, the intermittency may be temporal and/or spatial in nature. An example of spatial intermittency is calculating the spatial frequency of occurrence of an item of interest when observations are made for several non-adjacent segments of space instead of time as in the prior examples. In such a case the axes labeled "Time" in FIG. 4A and FIG. 4B can be relabeled "Distance" and in all other respects the same calculations can be applied as in the original examples.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for intermittent sampling of storage access frequency, implemented by a computing processor, comprising:
    monitor frequencies of accesses of one or more storage objects intermittently by:
        determining a duration of a collection window by the computing processor;
        determining a duration of an observation window within the collection window by the computing processor;
        avoiding omission of periodic activity of the frequencies of accesses in the collection window due to harmonic aliasing by randomly selecting a starting position of the observation window within the collection window by the computing processor, wherein the observation window is a fixed width that begins and ends within the collection window;
        observing frequencies of accesses of the one or more storage objects during the observation window by the computing processor;
        reducing temporary storage used to store observed frequencies of accesses via the intermittent monitoring; and
        approximating the frequencies of accesses for each of the one or more storage objects that occur through continuous monitoring using the frequencies of accesses observed through the intermittent monitoring, wherein the frequencies of access is approximated for a given storage object to determine a level in the storage hierarchy in which to store the given storage object.

2. The method of claim 1, wherein the observing of the frequencies of the accesses of the one or more storage objects comprises:
    determining that a new access of the given storage object occurs; and
    in response to determining that the new access of the given storage object occurs, calculating a delta time for the given storage object as a time of the new access minus a timestamp of a most recent observed prior access of the given storage object.

3. The method of claim 2, wherein the calculating of the delta time as the time of the new access minus the timestamp of the most recent observed prior access of the given storage object comprises:
    calculating the delta time of two sequential accesses of the given storage object in two different observation windows as if the two different observation windows are immediately adjacent to each other.

4. The method of claim 3, wherein the observing of the frequencies of the accesses of the one or more storage objects comprises:
    observing the frequencies of the accesses of the one or more storage objects in a first observation window (W1) and a second observation window (W2), wherein observation is disabled during a time period (D1) between W1 and W2;
    observing a first access of the given storage object at a first time (T1) in W1 and a second access of the given storage object at a second time (T2) in W2, wherein no access of the given storage object is observed between T1 and T2; and
    calculating the delta time as equal to T2−T1−(width of D1).

5. The method of claim 3, wherein the observing of the frequencies of the accesses of the one or more storage objects comprises:
    observing the frequencies of the accesses of the one or more storage objects in a first observation window (W1), a second observation window (W2), and a third observation window (W3), wherein observation is disabled during a time period (D1) between W1 and W2 and during a time period (D2) between W2 and W3;
    observing a first access of the given storage object at a first time (T1) in W1 and a second access of the given storage object at a second time (T2) in W3, wherein observation is disabled during D1 and D2, wherein no access of the given storage object is observed between T1 and T2; and
    calculating the delta time as equal to T2−T1−(width of D1)−(width of D2).

6. The method of claim 1, wherein the observing of the frequencies of the accesses of the one or more storage objects is performed by an event monitor, wherein a monitoring by the event monitor is enabled and disabled using a state switch for the event monitor and a collect clause for a database workload, wherein either the state switch or the collect clause are maintained in an enabled position.

7. The method of claim 2, further comprising:
    computing a mean and standard deviation for a plurality of storage objects based on observed frequencies of accesses of the plurality of storage objects;
    determining a z-score for the given storage object based on a mean computed over the delta times for the given storage object and the mean and standard deviation of the plurality of storage objects; and
    determining the level in the storage hierarchy corresponding to the z-score of the given storage object, wherein a more frequently accessed storage object is stored within the storage hierarchy in higher cost storage, where the frequently accessed storage object is accessed quicker than a less frequently accessed storage object.

* * * * *